Patented Mar. 13, 1951

2,544,714

UNITED STATES PATENT OFFICE 2,544,714

WATER-RESISTANT ADHESIVE

Edward E. Moore, Yonkers, N. Y., assignor to Stein, Hall & Company, Inc., New York, N. Y., a corporation of New York No Drawing. Application July 12, 1949, Serial No. 104,387

14 Claims. (Cl. 260—17.3)

1

This invention relates to a dry powder composition consisting essentially of a low-solubles modified starch, a water-soluble heat-hardenable amido-formaldehyde condensate or resin intermediate, an acidic material that gives a 3% aqueous solution which has a pH in the range of 3.0 to 3.6, and a higher organic-sulfo salt detergent, all in critical proportions that give a 28.6% solids cooked aqueous dispersion thereof having a pH in the range of 3.0 to 3.6 and an operable viscosity for use as an adhesive in a paper bag forming machine, which adhesive is stable and develops into a water resistant bond upon drying at room temperature in about 2 days after application. The invention also relates to a method of cooking an aqueous slurry of this composition to prepare an adhesive having an operable viscosity for application immediately after cooking, which viscosity is stable for a long period of time, up to about 2 weeks or more. The invention also relates to the adhesive pastes prepared by this method.

The adhesive art has long sought an economical water resistant adhesive material; and a relatively recent proposal for providing such a material involves cooking a slurry of a commercial dry converted starch in water, and then adding a powdered, soluble urea-formaldehyde condensate. There is added to this paste just prior to its use an acidic catalyst, such as formic acid, or ammonium chloride, or ammonium sulfate, to reduce the pH and so that the adhesive will have better water resistance when dried. The production and use of such an adhesive involves many difficulties.

In another recent proposal, an aqueous slurry or mixture of the starch with the urea-formaldehyde condensate and an acidic material to lower the pH to substantially 4.0 is cooked until the viscosity thereof becomes so high that the material is unsuitable for application, i. e. becomes a gel or a very heavy paste. The cooking is then further continued until the viscosity of the paste decreases into the range where it is again suitable for application. The starch material proposed for use therein may be native starch, or starchy flour, or starch which is modified or converted to any desired extent. This proposal also leaves much to be desired, especially as to avoiding the practical difficulties associated with the unavoidable thick paste or gel.

It has been found, in accordance with the invention, that an economical water resistant adhesive may be prepared by adding a single, precompounded dry mixture to water in an amount

2 to give a final product having a suitable fluidity for application, and heating the slurry or mixture to about 190° F. The resulting product is of suitable fluidity immediately upon cooking, or after cooling to room temperature, and retains this fluidity for a long period of time, e. g. up to 2 weeks or more, without becoming so viscous that it is unsuitable for application.

In order to achieve these results, a particular type of modified starch material must be used; and the proportions of the various components must be within certain critical ranges.

The objects achieved in accordance with the invention include the provision of a stable dry composition which is adapted for adding to water and cooking to form an adhesive paste having suitable fluidity for application, which paste retains this fluidity for a long period of time, and which paste develops water resistance after drying; the provision of a method of cooking this particular composition to provide an adhesive which is suitable for application immediately upon cooking or upon standing for a long period of time and which develops water resistance after drying; the provision of an economical cooked adhesive paste which is of suitable fluidity for application, which retains this fluidity for a long period of time and which develops water resistance upon drying; and other objects which will be apparent as details or embodiments of the invention are set forth hereinafter.

In order to facilitate a clear understanding of the invention, a preferred embodiment is included at the outset.

This embodiment is directed to a water resistant adhesive for use in a bag forming machine for making paper bags under conventional operating conditions. Such an adhesive must be non-stringy, and it is desirable that it have a Brookfield Viscometer viscosity at 24° C. in the range of 700 to 3600 cps. (centipoises).

EXAMPLE 1

The following dry formulation (all parts herein are by weight calculated as anhydrous unless otherwise indicated):

78.0 parts white corn dextrin (normal 4–8% moist. cont.)

10.0 parts alum (technical aluminum sulfate, as anhydrous)

10.0 parts dimethylolurea 2.0 parts technical neutral sodium salt of sulfated fatty monoglyceride (about 33% of the sulfate half ester and about 67% of sodium sulfate)

is mixed with water in the proportion of 1 part of the dry formulation to 2.5 parts of water, (i. e. about 28.6% solids) and brought up to a temperature of 190° F. It may be held at this temperature for up to 30 minutes, but this is not necessary; and it is cooled or allowed to cool to room temperature. Its pH during cooking is in the range of 3.0 to 3.4, and its pH remains in this range upon standing at room temperature for a long time, up to 2 weeks or more. Its initial Brookfield Viscometer viscosity, upon cooling to 24° C., is 800 cps. upon standing 24 hours it is 3200 cps., and upon standing 1 week it is 1900 cps., and upon standing for another week it is 2200 cps. This paste is of suitable fluidity for application all during this 2-week period; and it does not gel or become too viscous for application at any time during this long period.

*Water resistance test*

Sections of strips of 40# kraft paper are coated with this adhesive, e. g. by dipping a ¼ inch diameter glass rod into a batch of the adhesive, drawing out the rod vertically and allowing the excess of the adhesive to flow off, and then horizontally drawing and rolling the rod on one side, e. g. the felt side, of the strip of paper. Another strip of paper is then applied with its other side, e. g. wire side, to this coating or seam of the adhesive, and wiping pressure applied by hand to assure contact. The laminated strips are then dried over-night under pressure (about 1 oz. per sq. in.), and allowed to air-dry at room temperature for 24 hours without pressure.

The aged seam is then tested for water resistance, by totally immersing the seam in a beaker of tap water for 24 hours at room temperature, and then pulling apart the 2 laminated strips. Good water resistance is indicated by tearing of the fibre in the paper at the seam.

Seams of this paper bonded with the above adhesive showed good water resistance when tested (test started) 2 days after the seam was made and also when tested 7 days after the seam was made.

This adhesive paste is eminently suitable for use in conventional bag forming machines for making paper bags, and is readily prepared in one step, without complications such as gels or unsuitable pastes, is sufficiently stable for all practical operations, and develops a water resistant bond or seam in a relatively short period of time upon drying and standing at room temperature. Its use does not require changes in conventional paper bag manufacturing operations.

In a trial run similar to Example 1, but without any of the sodium organic sulfosalt, the initial viscosity of the paste was only one-half as much as that of the paste of Example 1 (indicating that the organic sulfosalt has a definite effect upon reactions occurring during the heating). On standing under similar conditions, at the end of 1 week, the viscosity of this trial run paste was about 3 times that of the paste of Example 1, and at the end of 2 weeks, its viscosity was about 9 times that of the Example 1 material. This shows that the organic sulfosalt in the Example 1 formulation is critical and essential for maintaining the stability of the paste prepared therefrom.

It seems most reasonable to expect that the organic sulfosalt detergent in the Example 1 formulation would interfere with or prevent the adhesive prepared therefrom from having or developing water resistance upon drying. Surprisingly enough, however, it is found that the water resistance of adhesive bonds, as above tested, is just as good for the adhesive prepared from the Example 1 formulation, as it is from the comparable trial formulation having no organic sulfo salt.

The single, pre-compounded dry formulation of Example 1 is preferred for commercial purposes. However, if desired, the dry formulation may be made up without the alum, and the alum added after heating to about 190° F., or even after the heating and then cooling to about 24° C. However, if the organic sulfo salt is not included, the latter procedure would not give a suitable paste; instead, it would be very difficult to add and disperse the alum, and in addition, although the initial viscosity would be very low, it would jump to an extremely high figure within 24 hours, go even higher within a week, and become a heavy gel paste within 2 weeks.

The proportions of the components in the formulation of Example 1 may be varied within certain limits to give compositions which give cooked pastes having the desired viscosity stability and which develop water resistance upon drying; e. g. as are attained with the following typical formulations and similar formulations wherein the amount of the alum is varied between 5 and 15 parts.

EXAMPLE NO. 2

78 parts white dextrin
5 parts alum
10 parts dimethylolurea
2 parts sulfate ester salt (of Ex. 1)

EXAMPLE NO. 3

78 parts white dextrin
15 parts alum
10 parts dimethylolurea
2 parts sulfate ester salt (of Ex. 1)

If the amount of alum in the Example 1 formulation is reduced to 1 part, the resulting adhesive paste does not develop water resistance, as above defined. If the amount of alum therein, is only 2.5 parts, the water resistance developed by the adhesive paste is poor. The formulation with 5 parts of alum gives a paste which develops fairly good water resistance, but takes a relatively long time to do so; the same is true of a paste made from the above formulation wherein 20 parts of alum is used. The viscosity of the latter paste tends to get rather high at the end of 24 hours standing at 25° C.; and although this amount is operable, it is preferred to use from 5 to 15 parts of alum in the above formulation, especially 10 parts. This range is about 6.8 to 19.2% based on the weight of the starch material.

The desired characteristics are also obtained in the above formulation wherein the amount of the dimethylolurea is varied within the range of 5 to 10 parts. This is indicated in the following formulation:

EXAMPLE NO. 4

78 parts white dextrin
5 parts alum
5 parts dimethylolurea
2 parts sulfate ester salt (of Ex. 1)

In this formulation, if the amount of dimethylolurea is 1 part or 2.5 parts, the adhesive paste does not develop good water resistance very rapidly. For rapid development of water resistance, it is preferred to have at least 5 parts of the dimethylolurea. If the amount of the dimethylolurea is 20 parts, the resulting paste is a heavy gel, at the above solids concentration, and would not be characterized as suitable for application in a bag forming machine. If the amount of dimethylolurea is 15 parts, the resulting paste, in the above concentration, is too heavy. Thus, in this series, for 5 parts of alum, the amount of dimethylolurea should be in the range of 5 to 10 parts; i. e. 6.8 to 12.8% based on the weight of the starch material.

In the Example 1 formulation, containing 10 parts of alum, the preferred amount of dimethylolurea is 10 parts. If a smaller amount is used, the resulting paste develops water resistance less rapidly. If a higher proportion is used, the resulting paste, of the above solids concentration, is a gel or is too heavy to be characterized as suitable for application in a bag forming machine.

For this type of formulation, the amount of dimethylolurea is in the range of 5 to 10 parts, and the amount of alum is in the range of 5 to 15 parts; but for amounts of alum in the range of 8 to 10 parts, the amount of the dimethylolurea is preferably the same as the amount of alum, and for amounts of alum in the range of 10 to 15 parts, the amount of the dimethylolurea is preferably less than the amount of the alum, so that the sum of the amount of alum plus the amount of dimethylolurea is not over 20.

The particular modified starch used in this paste is a white dextrin which may be made by the dry modification of corn starch having added thereto from about 0.03 to about 0.04% HCl in the form of an about 16% aqueous solution. This substantially dry mixture is roasted at a relatively low temperature in the range of 250°–400° F. until the solubles content thereof (e. g. in dist. water at 25° C.) is in the range of 3 to 6% by weight; and until the viscosity of the mixture obtained by mixing 21–22 grams thereof with 100 cc. of water and bringing the mixture up to 85° C. (185° F.) is such that 50 cc. at 85° C. of the mixture will flow through an orifice in a standard pipette in a period of time in the range of 35 to 40 seconds. The orifice in this standard pipette delivers 50 cc. of water at 25° C. in 11 seconds. Then the acidity therein may be used directly, or neutralized, e. g. by gaseous ammonia or a spray of aqueous soda ash, so that a 10% slurry thereof is substantially neutral, or is brought to a prescribed standard, e. g., a pH of 4.5–5.0.

This starch material may be made by blending one modified starch having higher solubles and gram viscosity values with another having lower values to give a blend having the above specified values for these properties.

Other suitable starches are the modified starches such as may be made by heating a suspension of common corn starch in dilute sulfuric acid (0.1 to 0.2N) to about 50° to 55° C. until the paste viscosity is reduced to the desired level; then it is neutralized, filtered, washed and dried. To be suitable, any modified starch of this type or the above described (roasted) type must have a solubles content in the range of about 0 to 30, and a standard pipette viscosity in the range of 10 to 30 grams, as above defined. The preferred starch materials are made from corn starch; however, other equivalent starch materials may be used.

The acidity of the starch material as well as of the methylol-amido and the sulfo salt ingredients should be taken into account in making up the dry formulation, and also in cooking the suspension to provide the proper pH.

Many modified starches are inoperative, e. g., any canary dextrin having a high solubles content e. g. in the range of 40 to 99+%, white tapioca dextrines having a standard pipette viscosity of 50 to 99 or more grams, acid modified thin boiling starches having a standard pipette viscosity of 1 to 8 grams.

Unmodified starch is unsuitable since it does not give a 28.6% solids cooked aqueous dispersion having an operable viscosity such as in the range of 700 to 3600 cps.

Technical aluminum sulfate is an economical material for providing the required pH in the adhesive, and for this reason it is preferred; however, the pure material gives comparable results in the above examples. The anhydrous form is preferred for the dry formulations. However, the hydrated forms are suitable, especially where the mixture is made up directly as the slurry. Other equivalent acidic compounds or mixtures of compounds which are characterized as giving a pH in the range of 3.0 to 3.6 at a concentration of 3% in water are suitable.

Dimethylolurea is readily available and for this reason is preferred as the amido-formaldehyde condensate. However, other equivalent water-soluble condensates of formaldehyde with urea, or with another amido material (e. g. containing the

group) may be used in an amount to provide the same amount or proportion of methylol-amido groups and equivalent to the dimethylolurea.

The higher organic sulfo salt is preferably a salt of a mono sulfuric acid half ester of a monoglyceride of a fatty acid or mixture of fatty acids having 8 to 18 carbon atoms in the fatty acid radical. The anion thereof may be sodium, potassium, or the like metal, or it may be the anion of a nitrogen base, such as ammonia or the like. Satisfactory results are obtained with the technical material containing a substantial proportion of inorganic salts, e. g. about 67% sodium sulfate, and since this is economical, it is preferred. The amount thereof used should provide from 0.5 to 2 parts of the organic sulfo salt in the above formulation for the purposes of the invention. Higher amounts are operable, but are not indicated for economic reasons. Equivalent detergents, e. g. a mono-sulfonate of a mono-alkyl benzene, wherein the alkyl is either straight chain or branch chained and contains from 8 to 18 carbon atoms.

The compositions of the invention are suitable for making pastes of other solids concentrations; e. g. higher concentrations up to about 35% solids, or down to 15%, if desired, depending upon the application for which the paste is to be used. These pastes are suitable for application at ambient temperatures (e. g. 70° F.) or elevated temperatures up to about 190° F.; and they may be used for laminating paper or paper board, paper tube winding, or the like.

As already pointed out, the formulation of the invention is one consisting essentially of the above described components; but there may be included therewith other materials such as preservatives, fillers, or the like, as known to those skilled in the art, and which do not interfere with the purposes of the invention as set forth in the foregoing descriptions.

The invention as herein described is subject to modification and variation within the scope of the appended claims.

I claim:

1. A dry powder composition consisting essentially of 78 parts of a modified starch which has a water-solubles content in the range of about 0 to 30% and gives a 10 to 30 gram dispersion in 100 cc. of water having a 50 cc. standard pipette viscosity in the range of 35 to 40 seconds when heated to 85° C., 5 to 10 parts of a water-soluble heat-hardenable urea-formaldehyde condensate, 5 to 15 parts of an acidic material which gives a 3% aqueous solution having a pH in the range of 3.0 to 3.6, and 0.5 to 2 parts of a technical water-soluble salt of an organic sulfuric reaction product containing an alkyl radical of from 8 to 18 carbon atoms and a radical selected from the group consisting of a sulfate ester radical and a sulfonic radical, said composition being characterized by giving a stable adhesive paste upon cooling a 28.6% solids aqueous dispersion thereof which paste has a pH in the range of 3.0 to 3.6 and a Brookfield viscosity at 25° C. in the range of 700 to 3500 cps. and which develops into a water resistant bond upon drying and standing at room temperature.

2. The composition of claim 1 wherein the starch component is modified corn starch.

3. The composition of claim 2 wherein the amido-formaldehyde condensate is dimethylolurea.

4. A dry powder composition consisting essentially of 78 parts by weight of a partially neutralized white corn dextrin modified starch which has a water-solubles content in the range of 3 to 6% by weight and giving a 21–22 gram dispersion in 100 cc. of water having a standard pipette viscosity of 35 to 40 seconds when heated to 85° C., 5 to 10 parts of dimethylolurea, 5 to 15 parts of alum, and 2 parts of about 33% pure technical sodium sulfated fatty monoglyceride wherein the fatty group contains from 8 to 18 carbon atoms, said composition being characterized by giving a stable adhesive paste upon cooking a 28.6% solids aqueous dispersion thereof which paste has a pH in the range of 3.0 to 3.4 and a Brookfield viscosity at 25° C. in the range of 700 to 3600 cps. and develops into a water resistant bond upon drying and standing at room temperature.

5. A process of preparing an adhesive which comprises forming a 15 to 35% solids aqueous dispersion of a composition consisting essentially of 78 parts of a modified starch which has a water-solubles content in the range of about 0 to 30% and gives a 10 to 30 gram dispersion in 100 cc. of water having a 50 cc. standard pipette viscosity in the range of 35 to 40 seconds when heated to 85° C., 5 to 10 parts of a water-soluble heat-hardenable urea-formaldehyde condensate, an acidic material in an amount to give the dispersion a pH in the range of 3.0 to 3.6 and 0.5 to 2 parts of a technical water-soluble salt of an organic sulfuric reaction product containing an alkyl radical of from 8 to 18 carbon atoms and a radical selected from the group consisting of a sulfate ester radical and a sulfonic radical, and heating said dispersion to 190° F., the pH of said dispersion being in the range of 3.0 to 3.6 during and after said cooking, whereby there is formed a stable adhesive paste which is operable for use as an adhesive and which develops into a water resistant bond upon drying and standing at room temperature.

6. The process of claim 5 wherein the starch component is modified corn starch.

7. An adhesive paste prepared by the process of claim 6.

8. The process of claim 6 wherein the amido-formaldehyde condensate is dimethyolurea.

9. An adhesive paste prepared by the process of claim 8.

10. The process of claim 8 wherein the acidic material is added after the dispersion is heated to 190° F.

11. An adhesive paste prepared by the process of claim 10.

12. A process of preparing an adhesive which comprises forming a 28.6% aqueous dispersion of a composition consisting essentially of 78 parts of a white corn dextrin modified starch which has a water-solubles content in the range of 3 to 6% and gives a 21–22 gram dispersion in 100 cc. of water having a 50 cc. standard pipette viscosity in the range of 35 to 40 seconds when heated to 85° C., 5 to 10 parts of dimethylolurea, alum in an amount to give the dispersion a pH in the range of 3.0 to 3.4, and 2 parts of about 33% pure technical sodium sulfated fatty monoglyceride wherein the fatty group contains from 8 to 18 carbon atoms, and heating said dispersion to 190° F., the pH of said dispersion being in the range of 3.0 to 3.4 during and after said cooking, whereby there is formed a stable adhesive paste which is operable for use as an adhesive and which develops into a water resistant bond upon drying and standing at room temperature.

13. An adhesive paste prepared by the process of claim 12.

14. An adhesive paste prepared by the process of claim 5.

EDWARD E. MOORE.

REFERENCES CITED

The following references are of record in the file of this patent:

UNITED STATES PATENTS

| Number | Name | Date |
|---|---|---|
| 2,302,309 | Glarum | Nov. 17, 1942 |
| 2,450,377 | Kesler | Sept. 28, 1948 |